(12) United States Patent
Cook

(10) Patent No.: US 8,200,363 B2
(45) Date of Patent: Jun. 12, 2012

(54) TRANSPORT TRAILER AND METHOD

(75) Inventor: Mark Cook, Lufkin, TX (US)

(73) Assignee: Mark Cook, Lufkin, TX (US)

( * ) Notice: Subject to any disclaimer, the term of this patent is extended or adjusted under 35 U.S.C. 154(b) by 498 days.

(21) Appl. No.: 12/437,870

(22) Filed: May 8, 2009

(65) Prior Publication Data

US 2010/0286814 A1   Nov. 11, 2010

(51) Int. Cl.
*G06F 7/00* (2006.01)
*B29C 45/00* (2006.01)
*B60Q 1/00* (2006.01)
*B60P 1/02* (2006.01)
*B65G 69/00* (2006.01)

(52) U.S. Cl. ........ 700/214; 700/213; 700/200; 700/201; 700/218; 414/495; 414/679; 340/439; 235/375; 235/383

(58) Field of Classification Search .................. 700/214, 700/213; 235/385; 414/495, 679
See application file for complete search history.

(56) References Cited

U.S. PATENT DOCUMENTS

| | | | |
|---|---|---|---|
| 6,917,982 B1 | 7/2005 | Dueck et al. | |
| 7,003,375 B2 | 2/2006 | Inui | |
| 7,110,958 B2 | 9/2006 | Yang | |
| 7,136,832 B2 * | 11/2006 | Li et al. | 705/34 |
| 7,299,125 B2 | 11/2007 | Marks et al. | |
| 7,357,317 B2 | 4/2008 | Baldassari et al. | |
| 7,480,513 B2 | 1/2009 | Woo | |
| 7,484,663 B2 | 2/2009 | Olsen, III | |
| 7,487,019 B2 | 2/2009 | Estes et al. | |
| 2006/0011721 A1 * | 1/2006 | Olsen et al. | 235/385 |
| 2008/0089769 A1 * | 4/2008 | Cook | 414/679 |
| 2008/0286079 A1 * | 11/2008 | Cook | 414/349 |

* cited by examiner

*Primary Examiner* — Gene Crawford
*Assistant Examiner* — Yolanda Cumbess
(74) *Attorney, Agent, or Firm* — Streets & Steele

(57) ABSTRACT

A trailer (10) or container (11) includes a frame (12) having a central axis (14) spaced between rear wheels. A plurality of storage supports (20) are supported on the trailer frame, with each storage support supporting a plurality of objects thereon. A carousel (24) rotates the plurality of storage supports, and a powered drive rotates the carousel. The system includes a storage location signal, a vehicle location signal, and a door closed signal which are each input to a controller (90) for controlling rotation of the carousel, so that goods to be unloaded are on a support which is rotated to an unloading position.

20 Claims, 5 Drawing Sheets

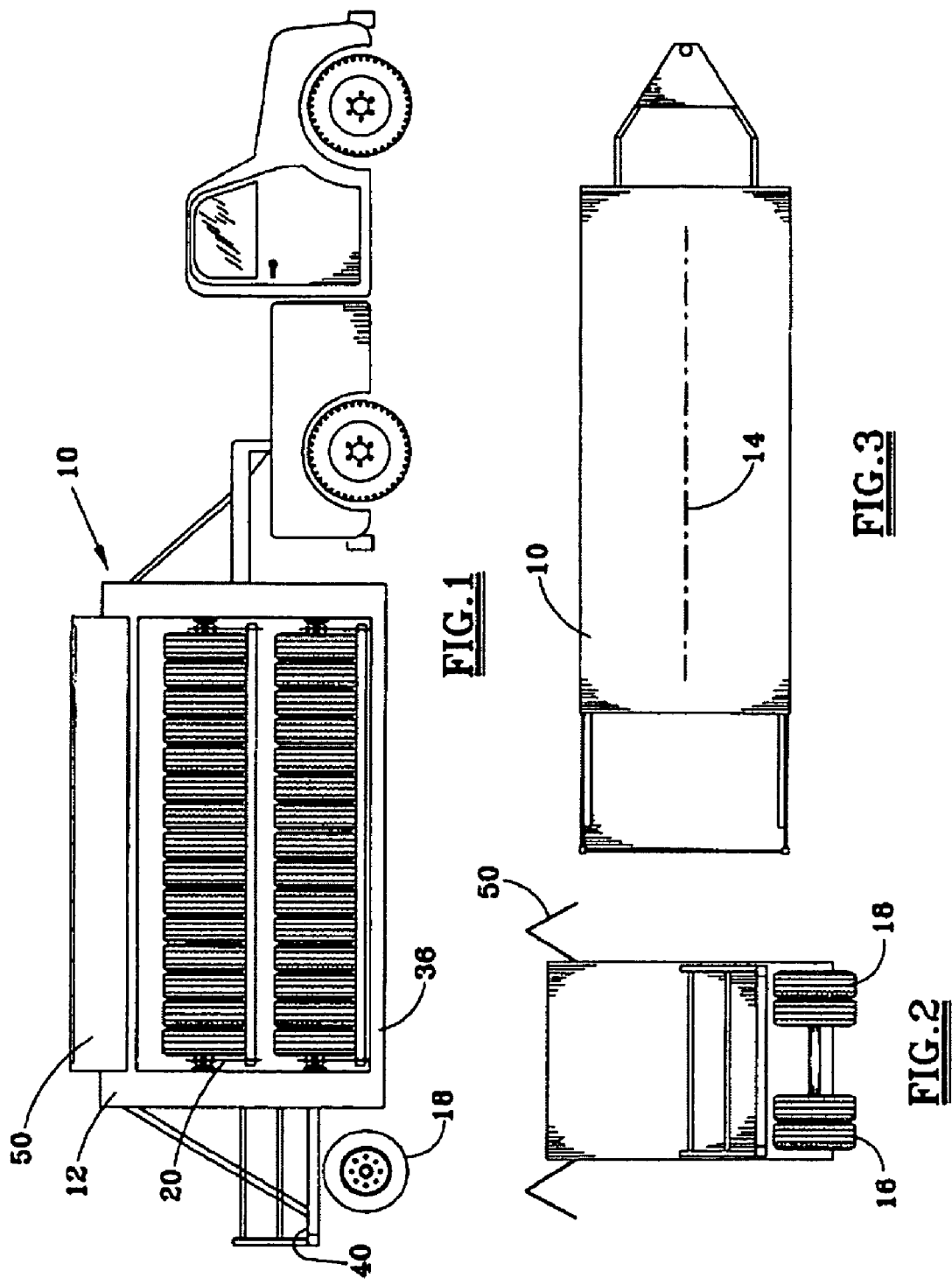

TRANSPORT TRAILER AND METHOD

FIELD OF THE INVENTION

The present invention relates to delivery vehicles of the type used to transport goods along public roadways to specific addresses or locations. More particularly, this invention relates to an improved delivery vehicle which significantly enhances the efficiency of the delivery driver while reducing the likelihood of injury.

BACKGROUND OF THE INVENTION

Various systems have been devised to enhance the efficiency of vehicular delivery systems and services. Patents of interest include U.S. Pat. Nos. 6,917,982, 7,003,375, 7,110,958, 7,299,125, 7,357,317, 7,484,663, and 7,487,019.

Some delivery systems include a GPS or similar location based signal to assist in the delivery services. In U.S. Pat. No. 7,480,513, a signal may provide the location of a mobile communication terminal in the delivery vehicle, which also communicates with a position information server. GPS systems have also been used on various types of farm equipment to control, for example, the rate at which pesticides are discharged as a function of the position of the farm equipment.

The prior art has not provided a system for significantly increasing the efficiency of the delivery driver, and delivery personnel customarily must meet stringent physical requirements in order to perform their jobs. The disadvantages of the prior art are overcome by the present invention, and an improved delivery system and method are hereinafter disclosed.

SUMMARY OF THE INVENTION

In one embodiment, a delivery vehicle for delivering goods to specific locations has a parked mode and a travel mode. The trailer frame includes at least one side door covering an opening in the frame when the side door is in the closed position, and a powered carousel rotatably mounted within the trailer frame and having a plurality of circumferentially spaced supports for supporting goods thereon. A computer receives a storage location signal indicating the location of specific goods supported on a specific one of the plurality of circumferentially spaced supports. A vehicle location signal indicates when the vehicle is in the parked mode, and a controller responsive to these signals rotates the carousel, if necessary, so that specific goods are on the one of the plurality of circumferentially spaced supports which has been rotated to an unloading position.

According to one embodiment of the method of the invention, a computer is provided for receiving a storage location signal. A vehicle location signal is generated when the vehicle is in the parked position. A controller is provided responsive to the storage location signal and the vehicle location signal for rotating the carousel so that specific goods are on one of the plurality of circumferentially spaced supports which is automatically rotated to an unloading position.

These and further features and advantages of the present invention will become apparent from the following detailed description, wherein reference is made to the figures in the accompanying drawings.

BRIEF DESCRIPTION OF THE DRAWINGS

FIG. 1 is a side view of a suitable trailer and powered operator cab with the side doors raised.

FIG. 2 is a rear view of the trailer shown in FIG. 1, with the side doors raised.

FIG. 3 is a top view of the trailer shown in FIG. 1, with the side doors closed and the operator cab removed.

DETAILED DESCRIPTION OF PREFERRED EMBODIMENTS

FIG. 1 discloses one embodiment of a trailer 10 for transporting tires. For the depicted embodiment, a powered operator cab may be used to transport the trailer removable from the cab, or the trailer may be integral with the frame of the powered transport cab. In the latter case, the combination of a trailer and a cab is generally referred to as a truck.

Figure 5:
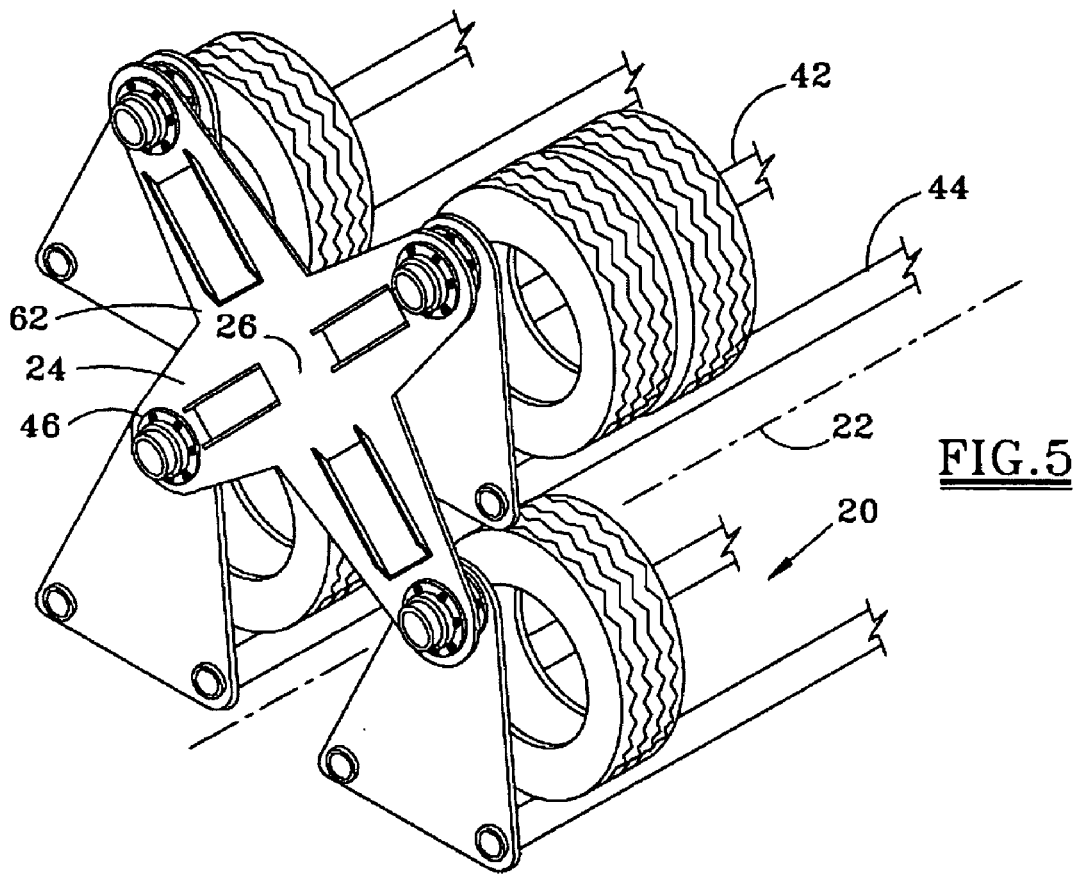
FIG. 5 illustrates a portion of the carriage assembly.
Figure 6:
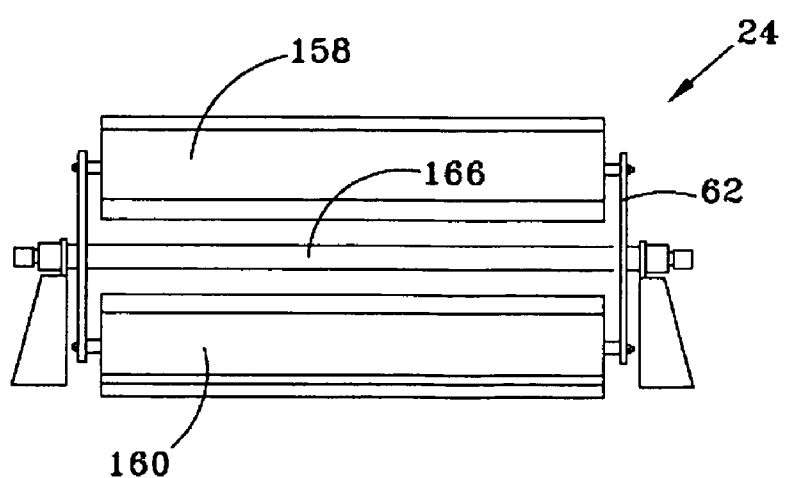
FIG. 6 illustrates a side view of an alternate drive mechanism for rotating the carriage.

The trailer includes a trailer frame 12 having a central axis 14 which, as shown in FIG. 3 is spaced between a left-side rear wheel 16 and a right-side rear wheel 18. As disclosed further below, the trailer frame supports a plurality of storage units 20, which for the embodiment depicted in FIG. 1, is a plurality of tires. Each storage unit has a storage support axis 22 which is substantially parallel to the trailer central axis 14. A portion of the carriage assembly 24 is shown in FIG. 5, and rotatably supports the plurality of tires about a carriage axis substantially parallel with the trailer central axis. For transporting tires, a lift mechanism is preferably provided for raising and lowering the carriage and thereby the objects supported on the storage units with respect to the trailer frame.

For the embodiment as shown in FIG. 1, the entirety of the carriage and the plurality of storage units are forward of the rear wheels of the trailer. A storage deck 40 is provided above the rear wheels for storing miscellaneous objects. As explained further below, the carriage assembly may be raised and lowered, so that when loading or unloading objects, the objects are desirably relatively close to the ground. In other embodiments, the carriage assembly has a stationary horizontal carriage axis and is not raised or lowered. As shown in FIG. 1, the low position of the tires relative to the ground is achieved by providing a lower portion 36 of the trailer frame which is vertically below the centerline of the wheels 16, 18. In a preferred embodiment, the trailer frame supports moveable side panels 50, which may be lowered to be flush with the exterior of the frame during transport, as shown in FIG. 3, but may be raised as shown in FIGS. 1 and 2 when the trailer is parked to allow for full viewing of the carriage operation. Other embodiments may use a door formed from horizontal slats which ride up into the top of the trailer when the door is opened.

Figure 4:
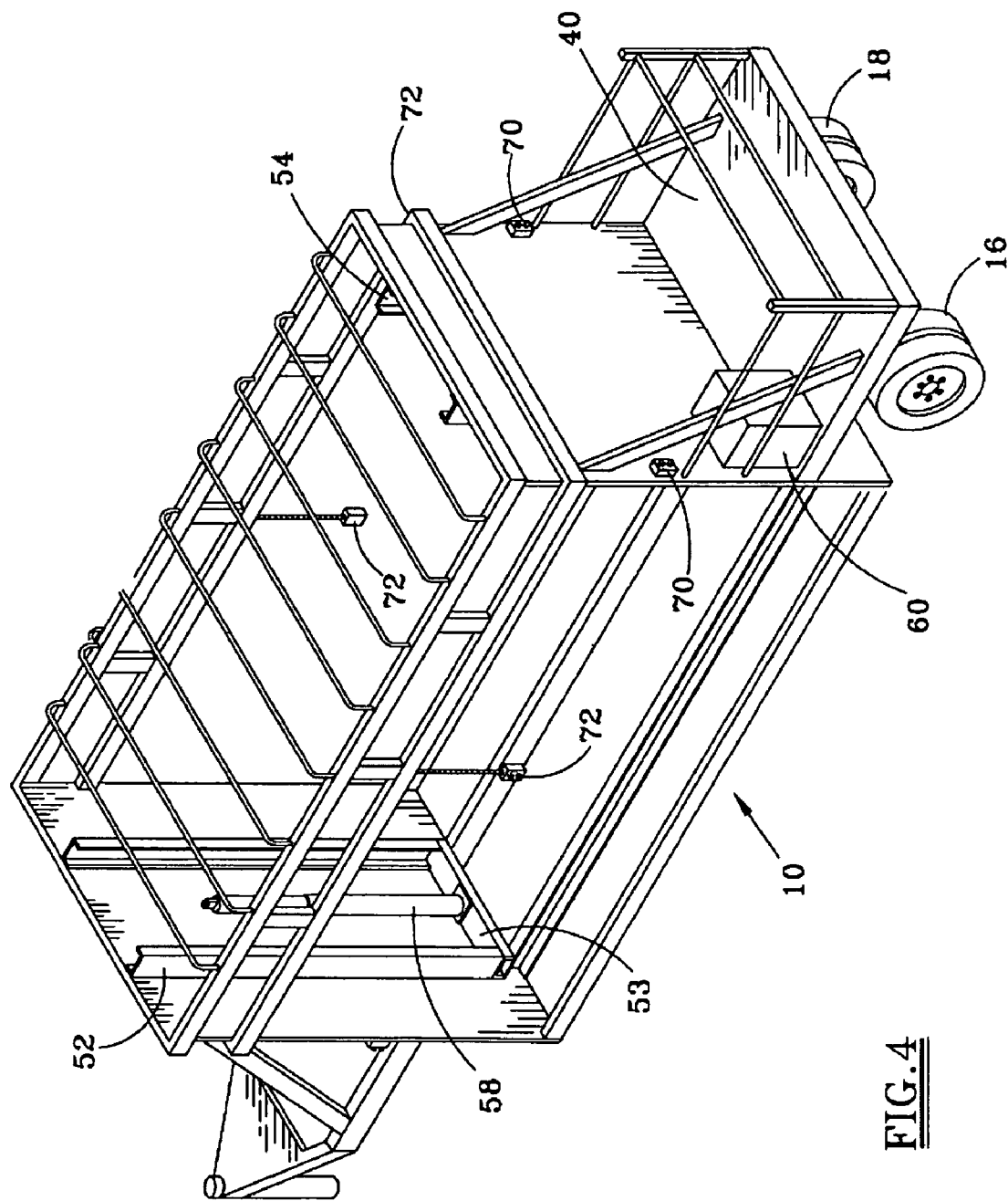
FIG. 4 is a pictorial view of a portion of the trailer shown in FIG. 1.

FIG. 4 shows in further detail suitable components of the trailer 10. The frame 12 includes a pair of spaced apart front guides 52, with each guide suitably formed by a C-channel. A similar pair of rear guides 54 are also shown. These guides allow for the selective raising and lowering of the carriage by one or more powered fluid cylinders 58. A lower portion of cylinder 58 is shown in FIG. 4 between the pair of front guides 52 and resting on a frame guide base 53. FIG. 4 also illustrates a suitable rear deck 40 for storage of miscellaneous components, including a power unit 60 for powering operation of the carriage assembly.

FIG. 5 illustrates a portion of the carriage assembly 24 which, for the depicted embodiment, includes 4 storage units each having a central axis 22 so that the storage unit may rotate as a subassembly about pivot 46 with respect to rotatable carriage end plate 62. For handling tires, the storage unit may include rods or other elongate supports 42, 44 as shown in FIG. 5, each extending between the spaced apart end plates 62 of the carriage assembly. The carriage assembly 24 may be raised or lowered by a lift mechanism including one or more powered cylinders 58 supporting a rotatable guide plate 62 at the upper end of each cylinder.

Various controls 70, 72 as shown in FIG. 4 may be provided at desired locations on the trailer, including the sides of the trailer where objects are loaded and unloaded onto and from the storage units, and at the rear of the trailer near the power unit 60. These controls may be regulated by an operator to slowly raise the carousel, thereby allowing activation of the motor to rotate the carousel so that the desired storage rack with the objects to be unloaded and loaded may be positioned on the desired side of the trailer and close to the ground. These controls 70, 72, if desired, may rotate the carousel in either a clockwise or a counterclockwise direction. Safety circuits may be used to ensure that the carousel is not rotated until raised to a sufficient level so that the carousel can rotate without hitting the lower frame of the trailer.

The storage supports as disclosed herein comprise a plurality of racks which are free to rotate with respect to the carriage end plates. In most applications, three or more racks may be equally spaced circumferentially about the carriage. Providing doors on both sides of the trailer allows the operator to load or unload goods from either side of the trailer. In some applications, the right-side of the trailer may be blocked, yet the operator may easily and safety unload goods from the left-side of the trailer. At the next delivery spot, the operator has the flexibility of unloading from the left-side of the trailer when the right-side of the trailer is blocked.

Depending on the goods being transported, the rotatable carriage assembly may benefit significantly from a lift mechanism, as disclosed herein. In other applications, and particularly those wherein the goods are relatively light, such as goods transported in the snack food industry, a lift mechanism for raising and lowering the carriage may not be necessary.

Figure 7:
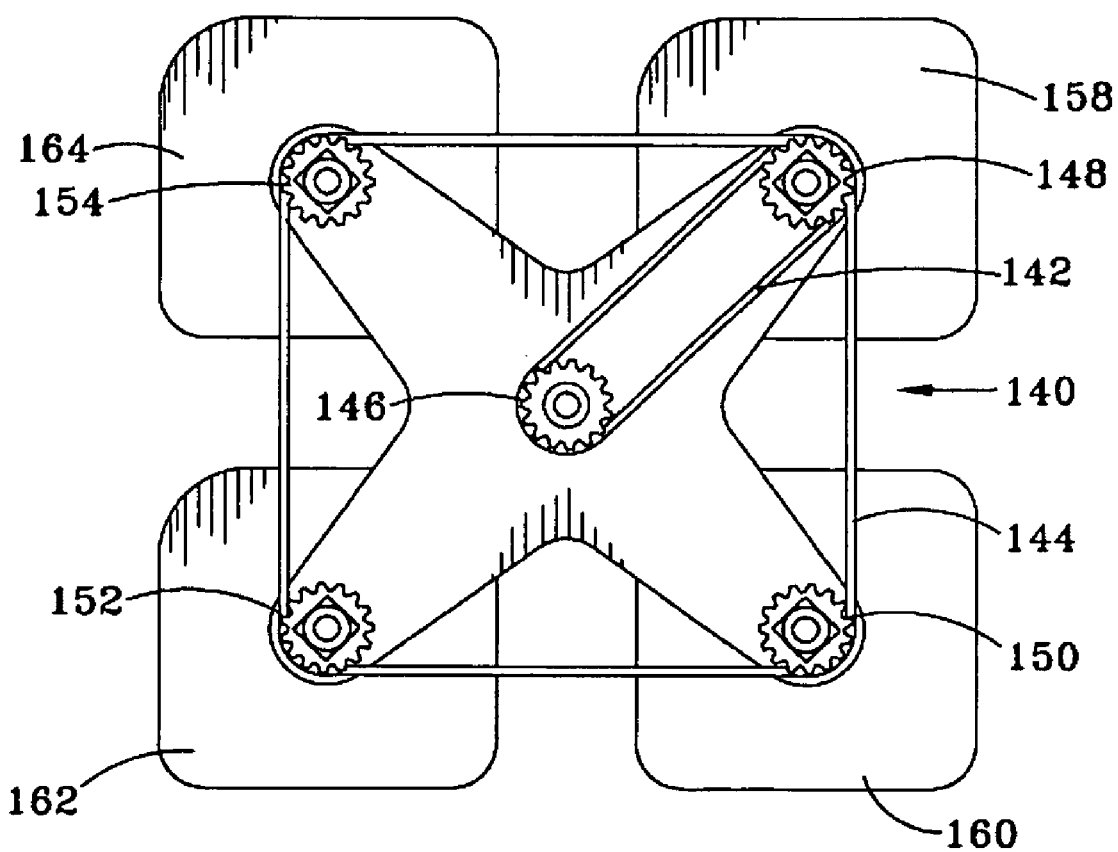
FIG. 7 illustrates a plurality of bins spaced along the carriage axis.

Referring to FIG. 7, a portion of an alternate carriage assembly is disclosed with a plurality of bins forming one or four storage units, with the bins being axially spaced along a storage unit central axis 22. This configuration allows the carriage to be highly adaptable for storing a variety of goods, such as parcels and packages. Each of the four storage units may be numbered so that, when loading the bins with goods, one may input the support number and, if desired, the bin number of a specific object being placed within a bin.

Figure 8:
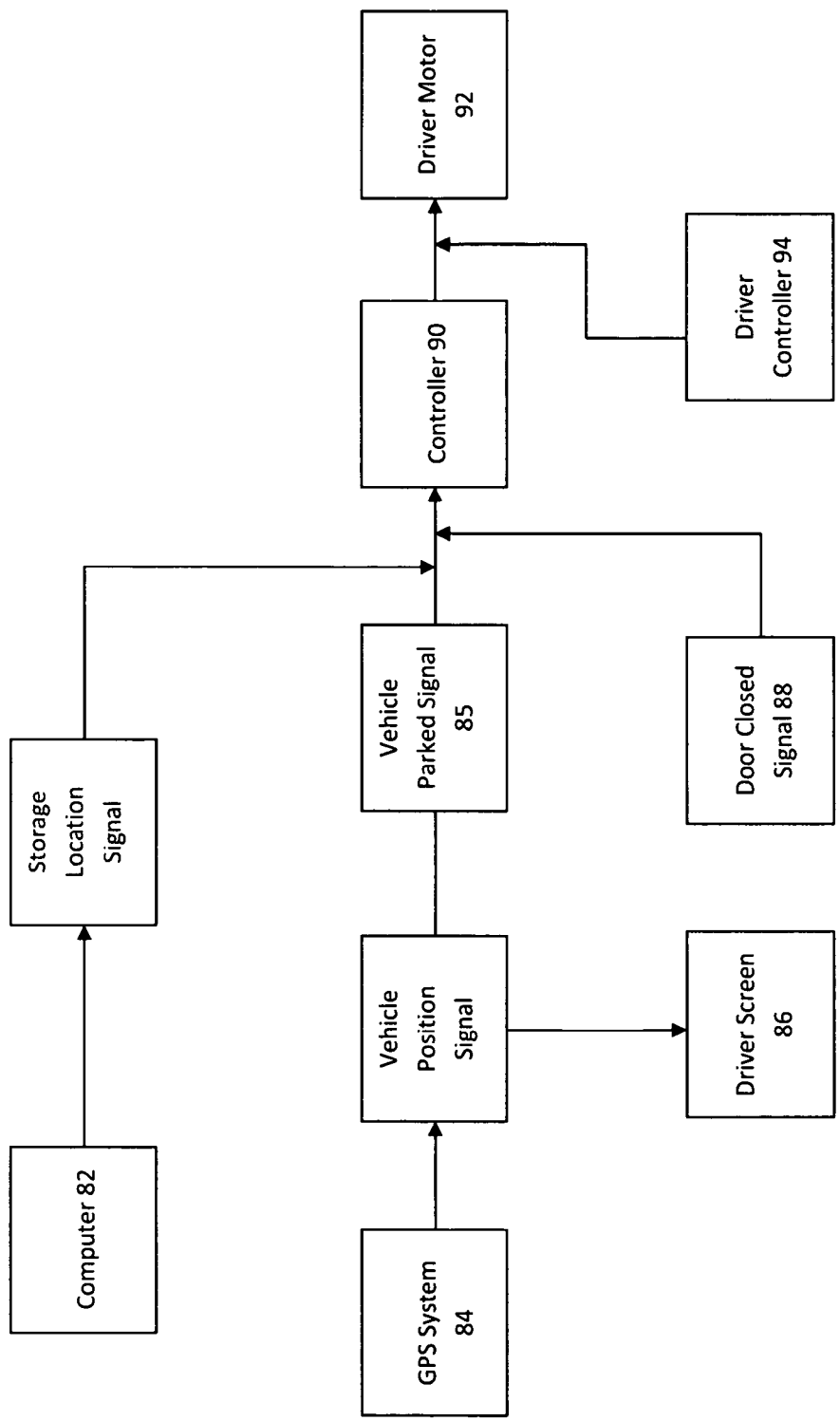
FIG. 8 is a simplified diagram of the system for rotating the carousel so that a storage support is in a selected unloading position.

Referring now to FIG. 8, the block diagram depicts a system for operating the delivery vehicle as disclosed herein, and specifically a delivery vehicle which has a powered carousel, although in this embodiment the carousel axis is not raised and lowered. The system as shown in FIG. 8 assumes that the vehicle driver has access to a handheld computer 82, into which information was entered as to specific goods loaded into specific supports and/or bins in the trailer. The vehicle further includes a vehicle location computer, such as a GPS system 84, which may serve several functions, but at a minimum outputs a vehicle location signal, i.e., a signal indicative of the vehicle being in a parked position and at or adjacent a specific site where delivery is to be made. The system as shown in FIG. 8 need not know the location of the vehicle when it is mobile, and an indication from sensor 85 that the vehicle is in the parked position allows the vehicle location signal to be transferred to controller 90. If desired, the vehicle location signal may also be output on screen 86, thereby providing this information to the driver. Finally, the system as shown in FIG. 8 includes a door closed signal from sensor 88 indicating that the door is in the closed position. The presence of a door closed signal thus allows operation of the controller 90, and prevents the operation of the controller if the door is not in the closed position. If desired, the one or more doors may be lockable and water-tight for protecting valuable cargo.

For each of the embodiments disclosed herein, computer 82, GPS system 84, and the controller 90 may be housed in the same package. In other embodiments, physically separable hardware may be provided. The door closed signal, as well as the door open signal may be provided by a conventional switch or laser sensor.

The controller 90 in turn outputs an operational signal to the carousel drive motor 92 to rotate the carousel, if necessary, so that the package stored within a specific storage unit or within a specific bin will desirably be rotated to an unloading location so that the package can be easily unloaded by the operator once the door is opened. The controller 90 thus recognizes the desired circumferential position in the carousel of the package to be delivered at a particular site, and rotates the carousel so that the package is at a desired unloading site. When a selected storage unit is at an unloading position, the remaining three storage units as shown in FIG. 7 on the carousel are in a storage position. To the extent additional packages should be delivered to the same site but for some reason are not stored in the storage support rotated to the unloading position, the operator may control operation of the carousel motor through a manual controller 94 so that the desired supports may also then be rotated to an unloading position. The driver is thus permitted to rotate the carousel to unload multiple goods at a single location adjacent where the vehicle is parked.

The system as shown in FIG. 8 may also be used for embodiments wherein the central axis of the carriage assembly is raised and lowered. In this case, however, the spacing between the sides of the trailer may not accommodate the width of the rotating carriage so that, in addition to being in the parked position, the door open signal from each of the two side doors is required before rotating the carriage. Once the controller receives the storage location signal, the vehicle position signal, the vehicle parked signal, and the two door open signals, the controller may first activate the drive motor to rotate the carriage so that one of the storage units is in a selected position, and if desired may thereafter lower the carriage so that the goods on the selected storage unit are in a desirably lowered position for loading and unloading.

The system as disclosed herein saves the driver a considerable amount of time in finding and unloading desired goods to be delivered to a specific location. Moreover, goods can be loaded and unloaded on the delivery vehicle with a minimum of strain, thereby reducing the likelihood of injury to a driver. The system of the present invention substantially eliminates unnecessary labor due to continual rearrangement of cargo on the vehicle. By providing for the loading or unloading of goods at an ergonomically desired location, the work force of drivers may be significantly increased.

The trailer as disclosed herein may have one or two opposing side doors and a rear door, with the rear door typically being used to unload and load non-standard sized products, e.g., products that cannot be reliably shelved on a storage support. In other embodiments, the trailer may have only one side door, or a side door and a rear door. In yet other embodiments, two or more side doors may be provided on either side of the trailer and/or additional rear doors may be provided, particularly for long trailers.

The trailer as disclosed herein may be used for transporting various objects other than tires. Bottles of water may be transported in a similar manner to tires, and oils or other liquids may be transported in drums or boxes. A conventional shelf or tray rather than space rods may be used to support a plurality of boxes between the end plates, and such a support tray would be suitable for transporting vehicular batteries, package delivery boxes, and various products distributed to retail food stores, including produce, dairy products, cookies/crackers, bread, and potato chips. A tray or bin may extend between the end plates, replacing the purpose of the rods 42, 44. The tray or bin preferably having a base or floor and sides. The tray or bin may be suitably supported to hold to the weight of the goods between the end plates 62.

The term "trailer" as used herein refers to a trailer or other container removably connected to a powered operator cab and configured for moving along public roads, whether termed a tractor, a truck, or a cab, and includes fifth wheel trailers and gooseneck trailers. A "trailer" also includes the trailer portion of cab/trailer combinations, whether detachable from the cab or integral with the cab. A conventional utility truck for delivery of parcels or bread is thus considered to include a trailer which is fixed to rather than removable from the cab. The trailer of the present invention offers the ability to sort various products for delivery or pickup, to load the goods curbside on either side of the trailer, and to handle heavy objects without significant lifting. A refrigerated trailer may be used for transporting dairy products, meat, or seafood.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A delivery vehicle having a parked mode and a travel mode for delivering goods to specific locations, comprising:
   a trailer frame having a longitudinal axis and including at least one door for substantially closing an opening in the trailer when the door is in the closed position and opening for access to the goods within the trailer frame when in the open position;
   a powered carousel rotatably mounted within the trailer frame, the carousel rotatable about a carousel axis substantially parallel to the longitudinal axis, the powered carousel including a plurality of circumferentially spaced supports each radially outward from the carriage axis for supporting goods thereon, each support having an unloading position and circumferentially spaced storage position;
   a computer receiving a storage location signal indicating the location of specific goods supported on a specific one of a plurality of circumferentially spaced supports;
   a vehicle location signal indicative of the vehicle being in the parked mode at a specific location;
   a sensor outputting a door closed signal responsive to the at least one door being in the closed position;
   a controller responsive to the storage location signal, the vehicle location signal, and the door closed signal for rotating the carousel so that the specific goods on the one of the plurality of circumferentially spaced supports are rotated to the unloading position for delivery of the good to the specific location when the door is in the door closed position.

2. A delivery vehicle as defined in claim 1, wherein the controller automatically rotates the carousel in response to the storage location signal, the vehicle location signal, and the door closed signal.

3. A delivery vehicle as defined in claim 1, further comprising:
   a screen for advising the delivery driver of a specific location in response to the vehicle location signal.

4. A delivery vehicle as defined in claim 1, wherein the vehicle location signal is a GPS signal.

5. A delivery vehicle as defined in claim 1, further comprising:
   a hydraulically powered drive motor responsive to the controller for rotating the powered carousel.

6. A delivery vehicle as defined in claim 1, wherein each of the circumferentially spaced supports includes a plurality of bins each for receiving goods therein and spaced along the carousel axis.

7. A delivery vehicle as defined in claim 1, wherein a lower portion of the opening in the frame is below the carousel axis.

8. A delivery vehicle as defined in claim 1, further comprising:
   each storage support having a storage support axis substantially parallel to the trailer frame central axis.

9. A delivery vehicle as defined in claim 1, further comprising:
   a drive motor for rotating the carriage about the carriage axis; and
   a rotatable drive member on the carousel rotatable in response to the drive motor, a flexible member interconnecting the rotatable drive member and one or more of a plurality of driven members each rotatable with a respective storage support, thereby simultaneously rotating the plurality of storage supports.

10. A delivery vehicle as defined in claim 9, wherein the flexible member is each one of a flexible chain and a timing belt.

11. A delivery vehicle as defined in claim 9, wherein the rotatable drive member and each of the one or more rotatable driven members are one of a sprocket and pulley each having an axis substantially parallel to a storage support axis.

12. A delivery vehicle having a parked mode and a travel mode for delivering goods to specific locations, comprising:
   a trailer frame having a longitudinal axis and including at least one side door at least substantially covering an opening in the frame when the side door is in the closed position, the trailer frame including at least one door for substantially closing the opening in the trailer when the door is in the closed position and opening for access to the goods within the trailer frame when in the open position;
   a powered carousel rotatably mounted within the trailer frame, the carousel rotatable about a carousel axis substantially parallel to the longitudinal axis, the powered carousel including a plurality of circumferentially spaced supports each radially outward from the carriage axis for supporting goods thereon, each support having an unloading position and a circumferentially spaced storage position;
   a drive motor for rotating the powered carousel;

a computer receiving a storage location signal indicating the location of specific goods supported on a specific one of a plurality of circumferentially spaced supports;

a vehicle location signal indicative of the vehicle being in the parked mode at a specific location; and a controller responsive to the storage location signal and the vehicle location signal for automatically rotating the carousel so that the specific goods are on the one of the plurality of circumferentially spaced supports rotated to an unloading position for delivery of the good to the specific location.

13. A delivery vehicle as defined in claim 12, further comprising:

a door closed signal responsive to the door being in the closed position, the door closed signal being input to the controller for preventing rotation of the carousel when the at least one door is not in the door closed position.

14. A delivery vehicle as defined in claim 12, further comprising:

a screen for advising the delivery driver of a specific location in response to the vehicle location signal.

15. A delivery vehicle as defined in claim 12, wherein the controller automatically rotates the carousel, if necessary, in response to the storage location signal, the vehicle location signal, and the door closed signal; and a rotatable drive member on the carousel, a flexible member interconnecting the rotatable drive member and one or more of a plurality of driven members each rotatable with a respective storage support, thereby simultaneously rotating the plurality of storage supports.

16. A delivery vehicle as defined in claim 12, wherein each of the circumferentially spaced supports includes a plurality of bins each for receiving goods therein and spaced along the carousel axis.

17. A method of delivering goods to specific locations using a delivery vehicle having a parked mode and a travel mode, comprising:

providing a trailer frame having a longitudinal axis and including at least one side door at least substantially covering an opening in the frame when the side door is in the closed position;

rotatably mounting a carousel within the trailer frame, the carousel rotatable about a carousel axis substantially parallel to the longitudinal axis, the powered carousel including a plurality of circumferentially spaced supports each radially outward from the carriage axis for supporting goods thereon, each support having an unloading position and a circumferentially spaced storage position;

providing a computer for receiving a storage location signal indicating the location of specific goods supported on a specific one of a plurality of circumferentially spaced supports;

generating a vehicle location signal indicative of the vehicle being in the parked mode at a specific location; and providing a controller responsive to the storage location signal and the vehicle location signal for rotating the carousel so that the specific goods are on the one of the plurality of circumferentially spaced supports rotated to an unloading position for delivery of the good to the specific location.

18. A method as defined in claim 17, further comprising:

providing a side door on the trailer frame for substantially closing the opening in the trailer when the door is in the closed position and opening for access to the goods within the trailer frame when in the open position; and providing a door closed signal responsive to the door being in the closed position, the door closed signal being input to the controller for preventing rotation of the carousel when the door is not in the door closed position.

19. A method as defined in claim 17, wherein a lower portion of the opening in the frame is below the carousel axis.

20. A method as defined in claim 17, further comprising:

providing a drive motor for rotating the carriage about the carriage axis in response to the controller; and providing a rotatable drive member on the carousel, a flexible member interconnecting the rotatable drive member and one or more of a plurality of driven members each rotatable with a respective storage support, thereby simultaneously rotating the plurality of storage supports.

* * * * *